(12) United States Patent
Tsujimoto et al.

(10) Patent No.: US 9,885,453 B2
(45) Date of Patent: Feb. 6, 2018

(54) LIGHTING MEMBER, LIGHTING DEVICE, AND METHOD FOR INSTALLING LIGHTING MEMBER

(71) Applicant: SHARP KABUSHIKI KAISHA, Osaka-shi, Osaka (JP)

(72) Inventors: Masahiro Tsujimoto, Osaka (JP); Tsuyoshi Kamada, Osaka (JP); Shun Ueki, Osaka (JP); Tomoko Nango, Osaka (JP); Kazuyoshi Sakuragi, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/027,878

(22) PCT Filed: Oct. 16, 2014

(86) PCT No.: PCT/JP2014/077533
§ 371 (c)(1),
(2) Date: Apr. 7, 2016

(87) PCT Pub. No.: WO2015/056736
PCT Pub. Date: Apr. 23, 2015

(65) Prior Publication Data
US 2016/0252225 A1    Sep. 1, 2016

(30) Foreign Application Priority Data

Oct. 17, 2013    (JP) .................................. 2013-216496

(51) Int. Cl.
*F21S 11/00*    (2006.01)
*E06B 9/24*    (2006.01)
(Continued)

(52) U.S. Cl.
CPC ............... *F21S 11/007* (2013.01); *E06B 9/24* (2013.01); *E06B 9/264* (2013.01); *F21V 3/0409* (2013.01);
(Continued)

(58) Field of Classification Search
CPC ......... F21S 11/002; F21S 11/007; E06B 9/24; E06B 9/264; G02B 5/0236; G02B 5/0242; G02B 5/0257; G02B 2207/123
See application file for complete search history.

(56) References Cited

U.S. PATENT DOCUMENTS 5,880,886 A  *  3/1999  Milner .................... E06B 9/24
                                                  359/592
8,824,050 B2 *  9/2014  Vasylyev ........... G02B 19/0042
                                                  359/595
(Continued)

FOREIGN PATENT DOCUMENTS

JP        7-239403        9/1995
JP      2000-170467       6/2000
(Continued)

OTHER PUBLICATIONS

Machine translation of JP2009-266794, Nov. 2009.*
(Continued)

*Primary Examiner* — Christopher Mahoney
(74) *Attorney, Agent, or Firm* — ScienBiziP, P.C.

(57) ABSTRACT

A lighting film (1) includes a first base material (2), a plurality of lighting portions (3), and a void portion (9), and if a virtual straight line (F) that passes through a point (C), at which any one light ray of light entering the lighting portion (3) is incident on a reflective surface, and is orthogonal to a first surface (2a) of the first base material (2) marks a boundary between two spaces, a space with the light ray incident on the point (C) of the two spaces is labeled as a first
(Continued)

space (S1), and a space without the light ray incident on the point (C) is labeled as a second space (S2), the lighting film (1) has a function of decreasing intensity of light traveling toward the second space (S2) of light emitted from the first base material (2) or the lighting portion (3).

10 Claims, 13 Drawing Sheets

(51) Int. Cl.
*E06B 9/264* (2006.01)
*G02B 5/02* (2006.01)
*F21V 3/04* (2006.01)
*F21V 7/00* (2006.01)
*F21V 11/02* (2006.01)

(52) U.S. Cl.
CPC ............ *F21V 7/0091* (2013.01); *F21V 11/02* (2013.01); *G02B 5/0242* (2013.01); *G02B 5/0257* (2013.01); *G02B 5/0278* (2013.01); *E06B 2009/2417* (2013.01); *G02B 2207/123* (2013.01)

(56) References Cited

U.S. PATENT DOCUMENTS

| | | | |
|---|---|---|---|
| 9,180,635 B2* | 11/2015 | Suzuki | B29D 11/00605 |
| 9,366,403 B2* | 6/2016 | Kashiwagi | B29C 43/021 |
| 2009/0009870 A1 | 1/2009 | Usami | |
| 2013/0033873 A1* | 2/2013 | Suzuki | G02B 17/006 362/297 |
| 2013/0229603 A1 | 9/2013 | Tamaki et al. | |
| 2015/0129140 A1* | 5/2015 | Dean | E06B 9/24 160/5 |
| 2017/0023197 A1* | 1/2017 | Ueki | G02B 5/0215 |

FOREIGN PATENT DOCUMENTS

| | | |
|---|---|---|
| JP | 2003-035073 | 2/2003 |
| JP | 2007-120090 | 5/2007 |
| JP | 2008-040021 | 2/2008 |
| JP | 2009266794 A * | 11/2009 |
| JP | 2011-123478 | 6/2011 |
| JP | 2013-062157 | 4/2013 |
| JP | 2013-156554 | 8/2013 |
| JP | 2013-182227 | 9/2013 |

OTHER PUBLICATIONS

International Search Report for PCT/JP2014/077533, dated Jan. 27, 2015, 4 pages.
Written Opinion of the ISA for PCT/JP2014/077533, dated Jan. 27, 2015, 3 pages.

* cited by examiner

LIGHTING MEMBER, LIGHTING DEVICE, AND METHOD FOR INSTALLING LIGHTING MEMBER

TECHNICAL FIELD

The present invention relates to a lighting member, a lighting device, and a method for installing the lighting member.

The present application is the U.S. national phase of International Application No. PCT/JP2014/077533 filed Oct. 16, 2014, which designated the U.S. and claims priority from to Japanese Patent Application No. 2013-216496 filed in Japan on Oct. 17, 2013, the entire contents of each of which are hereby incorporated herein by reference.

BACKGROUND ART

A lighting film for letting sunlight into a room through, for example, a window of a building is proposed in PTL 1. In the lighting film, a plurality of unit prisms and flat surfaces are formed on one surface of an optically transparent support. Sunlight is let into a room through the unit prisms.

In the case of the above-described lighting film, however, light after passage through the lighting film may reach eyes of a person present in a room due to the effect of, for example, periodic motion of the sun. The light may cause glare, and the person in the room may feel discomfort. PTL 2 discloses a solar radiation shading control device which adjusts the opening degree of a blind on the basis of an index obtained from a particular mathematical formula for predicting glare such that the index has a value, at which glare does not cause discomfort.

CITATION LIST

Patent Literature

PTL 1: Japanese Unexamined Patent Application Publication No. 2008-40021
PTL 2: Japanese Unexamined Patent Application Publication No. 2007-120090

SUMMARY OF INVENTION

Technical Problem

The solar radiation shading control device in PTL 2 includes a blind as shading means and suppresses glare by mechanically adjusting the opening degree of the blind. The device thus suffers from the problem of high device cost.

One aspect of the present invention has been made to solve the above-described problem, and one object thereof is to provide a lighting member, a lighting device, and a method for installing the lighting member capable of inexpensively suppressing glare.

Solution to Problem

In order to attain the above-described object, a lighting member according to one aspect of the present invention includes a first base material having optical transparency, a plurality of lighting portions having optical transparency which are provided on a first surface of the first base material, and a void portion which is provided between the plurality of lighting portions, part of a side surface of the lighting portion in contact with the void portion functions as a reflective surface which reflects light entering the lighting portion, and if a virtual straight line F that passes through a point C, at which any one light beam of the light entering the lighting portion is incident on the reflective surface, and is orthogonal to the first surface of the first base material marks a boundary between two spaces, a space with the light beam incident on the point C of the two spaces is labeled as a first space, and a space without the light beam incident on the point C is labeled as a second space, the lighting member has a function of decreasing intensity of light traveling toward the second space of light emitted from the first base material or the lighting portion.

In the lighting member according to the one aspect of the present invention, the function may be a function of scattering the light traveling toward the second space.

In the lighting member according to the one aspect of the present invention, the function may be an anisotropic scattering function of causing more scattering in a plane along a main extending direction of the side surface of the lighting portion functioning as the reflective surface than scattering in a different plane.

In the lighting member according to the one aspect of the present invention, the function may be a function of selectively scattering the light traveling toward the second space.

In the lighting member according to the one aspect of the present invention, the first base material or the lighting portion may have light scattering ability.

The lighting member according to the one aspect of the present invention may further include a second base material which is provided on an opposite side of the lighting portions from the first base material, and a bonding layer which bonds the lighting portions and the second base material together, and the second base material or the bonding layer may have light scattering ability.

In the lighting member according to the one aspect of the present invention, the first base material or a light emitting side of the lighting portion may include a light attenuating member which decreases intensity of the light traveling toward the second space.

In the lighting member according to the one aspect of the present invention, the light attenuating member may be a light reflecting member which reflects the light traveling toward the second space.

In the lighting member according to the one aspect of the present invention, the light attenuating member may be a light absorbing member which absorbs the light traveling toward the second space.

A lighting device according to one aspect of the present invention includes a lighting member and a light attenuating member, the lighting member includes a first base material having optical transparency, a plurality of lighting portions having optical transparency which are provided on a first surface of the first base material, and a void portion which is provided between the plurality of lighting portions, part of a side surface of the lighting portion in contact with the void portion functions as a reflective surface which reflects light entering the lighting portion, and if a virtual straight line F that passes through a point C, at which any one light beam of the light entering the lighting portion is incident on the reflective surface, and is orthogonal to the first surface of the first base material marks a boundary between two spaces, a space with the light beam incident on the point C of the two spaces is labeled as a first space, and a space without the light beam incident on the point C is labeled as a second space, the light attenuating member has a function of decreasing intensity of light traveling toward the second space of light emitted from the first base material or the lighting portion.

A method for installing a lighting member according to one aspect of the present invention, the lighting member including a first base material having optical transparency, a plurality of lighting portions having optical transparency which are provided on a first surface of the first base material, and a void portion which is provided between the plurality of lighting portions, part of a side surface of the lighting portion in contact with the void portion functioning as a reflective surface which reflects light entering the lighting portion, the lighting member having a function of, if a virtual straight line F that passes through a point C, at which any one light beam of the light entering the lighting portion is incident on the reflective surface, and is orthogonal to the first surface of the first base material marks a boundary between two spaces, a space with the light beam incident on the point C of the two spaces is labeled as a first space, and a space without the light beam incident on the point C is labeled as a second space, decreasing intensity of light traveling toward the second space of light emitted from the first base material or the lighting portion, includes arranging the lighting member such that the side surface of the lighting portion functioning as the reflective surface faces downward in a vertical direction and installing the lighting member at an upper portion of a window.

Advantageous Effects of Invention

According to one aspect of the present invention, a lighting member, a lighting device, and a method for installing the lighting member capable of inexpensively suppressing glare.

DESCRIPTION OF EMBODIMENTS

Figure 1:
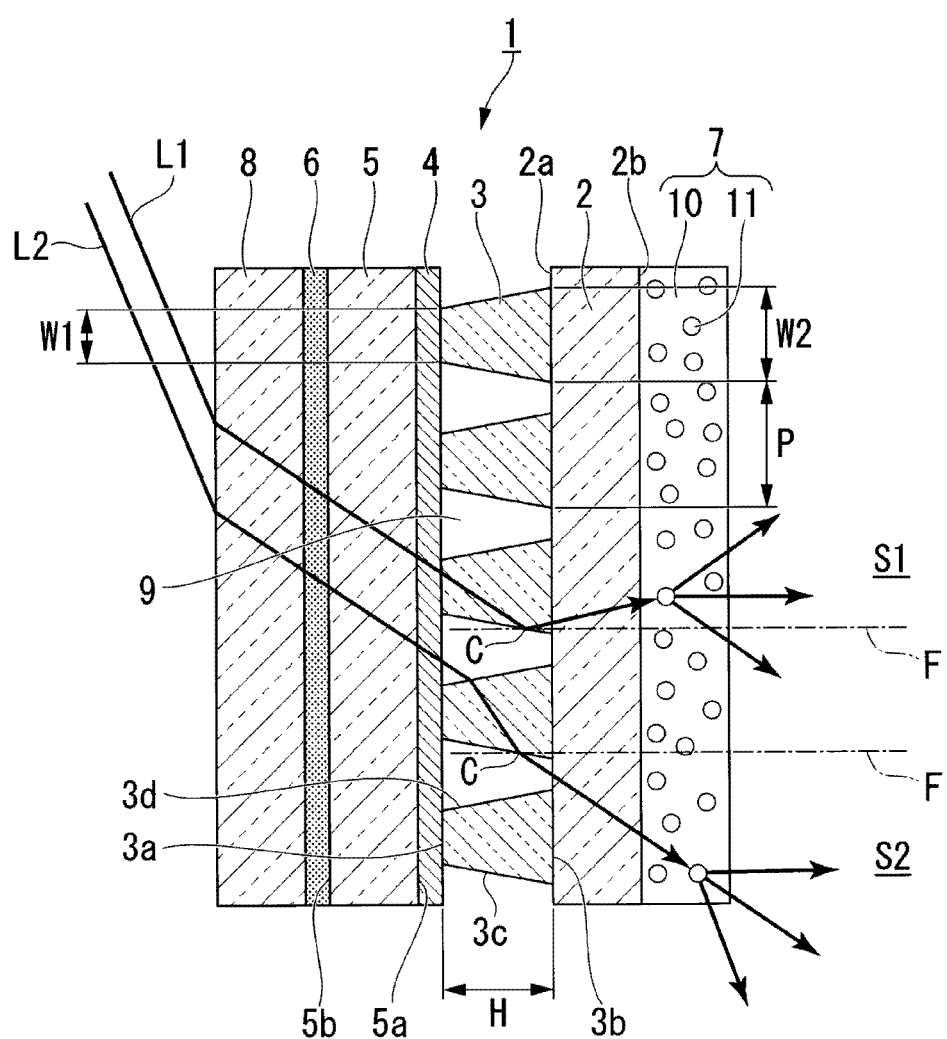
FIG. 1 is a cross-sectional view showing a lighting film according to a first embodiment of the present invention.

[First Embodiment]
A first embodiment of the present invention will be described below with reference to FIG. 1.
A lighting film according to the first embodiment is one example of a lighting member which lets sunlight into a room, for example, in a form attached to a window.
FIG. 1 is a cross-sectional view showing the lighting film according to the present embodiment.
Note that, in each of the drawings below, constituent elements are illustrated on different dimensional scales to increase the visibility of each constituent element.
As shown in FIG. 1, a lighting film 1 according to the present embodiment includes a first base material 2, a plurality of lighting portions 3, a first bonding layer 4, a second base material 5, a second bonding layer 6, and a light scattering layer 7. The plurality of lighting portions 3 are provided on a first surface 2a of the first base material 2. The second base material 5 is arranged so as to face the first surface 2a of the first base material 2 across the plurality of lighting portions 3. A first surface 5a of the second base material 5 and the plurality of lighting portions 3 are bonded together by the first bonding layer 4. The light scattering layer 7 is provided on a second surface 2b of the first base material 2. The second bonding layer 6 is provided on a second surface 5b of the second base material 5 and plays a role in bonding the whole of the lighting film 1 to a windowpane 8. Clearances between the plurality of lighting portions 3 constitute void portions 9.

As the first base material 2, an optically transparent base material made of, for example, a thermoplastic polymer or a resin, such as a thermosetting resin or a photopolymerizable resin. An optically transparent base material made of, for example, an acrylic polymer, an olefin-based polymer, a vinyl-based polymer, a cellulose-based polymer, an amid-based polymer, a fluorinated polymer, a urethane-based polymer, a silicone-based polymer, or an imide-based polymer is used. More specifically, an optically transparent base material, such as a triacetylcellulose (TAC) film, a polyethylene terephthalate (PET) film, a cycloolefin polymer (COP) film, a polycarbonate (PC) film, a polyethylene naphthalate (PEN) film, a polyether sulphone (PES) film, or a polyimide (PI) film, is preferably used. In the present embodiment, a PET film with a thickness of 100 μm is used as one example. The total light transmittance of the first base material 2 is preferably not less than, for example, 90%. With this configuration, sufficient transparency is achieved.

An optically transparent base material similar to that as the first base material 2 is used as the second base material 5. The material for the second base material 5 and the material for the first base material 2 may be the same or different.

The lighting portion 3 is made of an organic material having optical transparency and photosensitivity, such as an acryl resin, an epoxy resin, or a silicone resin. A transparent-resin mixture obtained by mixing a polymerization initiator, a coupling agent, a monomer, an organic solvent, or the like into one of the resins can be used. Additionally, the polymerization initiator may contain various additional components, such as a stabilizer, an inhibitor, a plasticizer, a fluorescent brightener, a mold lubricant, a chain transfer agent, or any other photopolymerizable monomer. The total light transmittance of the lighting portion 3 is preferably not less than 90%. With this configuration, sufficient transparency is achieved.

The lighting portion 3 is a member which extends long and narrowly in a linear fashion in one direction (a direction perpendicular to the sheet surface of FIG. 1) and has a trapezoidal cross-sectional shape orthogonal to a lengthwise direction. The lengthwise direction of the lighting portion 3 is parallel to one side of the rectangular first base material 2. The plurality of lighting portions 3 are arranged at intervals in parallel to one another. A surface corresponding to a short side of two sides parallel to each other of a trapezoid forming the cross-sectional shape of the lighting portion 3 is a surface facing the second base material 5 and will be referred to as a first end face 3a in the description below. A surface corresponding to a long side is a surface in contact with the first base material 2 and will be referred to as a second end face 3b in the description below.

Let W1 be the width of the first end face 3a of the lighting portion 3; W2 be the width of the second end face 3b of the lighting portion 3; H be the height in a normal direction of the first base material 2 of the lighting portion 3; and P be the spacing in an array direction of the lighting portions 3. All the lighting portions 3 are equal in the width W1 of the first end face 3a, the width W2 of the second end face 3b, the height H, and the spacing P of the lighting portions 3. The relationship W1<W2 holds for the width W1 of the first end face 3a and the width W2 of the second end face 3b. The width W1 of the first end face 3a and the width W2 of the second end face 3b of the lighting portion 3 are, for example, 10 μm to 50 μm. The height H of the lighting portion 3 is, for example, 10 μm to 100 μm.

Note that although an example with the plurality of lighting portions 3 arranged at intervals is shown here, edges of the second end faces 3b of the adjacent lighting portions 3 may be in contact with each other.

Air is present in the void portion 9. The refractive index of the void portion 9 is generally 1.0. The refractive index set at 1.0 of the void portion 9 minimizes a critical angle at an interface 3c between the void portion 9 and the lighting portion 3. Although the void portion 9 is an air layer made of air in the present embodiment, the void portion 9 may be an inert gas layer made of an inert gas, such as nitrogen, or may be a reduced-pressure layer under a reduced pressure.

The light scattering layer 7 has a configuration in which light scattering bodies 11 are dispersed in resin 10 having optical transparency. As the resin 10, a transparent-resin mixture obtained by, for example, mixing a polymerization initiator, a coupling agent, a monomer, an organic solvent, or the like into a resin, such as an acrylic resin, an epoxy-based resin, or a silicone-based resin can be used. The polymerization initiator may contain various additional components, such as a stabilizer, an inhibitor, a plasticizer, a fluorescent brightener, a mold lubricant, a chain transfer agent, and any other photopolymerizable monomer.

The light scattering body 11 is instrumental in scattering light entering the light scattering layer 7. The light scattering body 11 is a particle (small piece) which has a refractive index different from that of the resin 10 constituting the light scattering layer 7. Desirably, the light scattering bodies 11 are mixed into the light scattering layer 7 and are dispersed without clumping together. For the light scattering body 11, an optically transparent material made of, for example, a glass, an acrylic polymer resin, an olefin-based polymer resin, a vinyl-based polymer resin, a cellulose-based polymer resin, an amide-based polymer resin, a fluorinated polymer resin, a urethane-based polymer resin, a silicone-based polymer resin, or an imide-based polymer resin is used. Alternatively, the light scattering bodies 11 may be air bubbles dispersed in the resin 10. The shape of the light scattering body 11 may be, for example, a spherical shape, an oval spherical shape, a flat-plate shape or a polyhedron.

The sizes of the light scattering bodies 11 may be, for example, about 0.5 to 20 μm and may be uniform or different.

The light scattering layer 7 is not limited to a configuration with the dispersed light scattering bodies 11 and may be composed of a layer with asperities on a surface. In this case, the asperities may be formed directly on the second surface 2b of the first base material 2.

The first bonding layer 4 bonds the first surface 5a of the second base material 5 and the first end faces 3a of the plurality of lighting portions 3 together. For the first bonding layer 4, a common optical adhesive is used. The refractive index of the first bonding layer 4 is desirably equal to that of the second base material 5 or that of the lighting portion 3. If the refractive index of the first bonding layer 4 is equal to that of the second base material 5 or that of the lighting portion 3, refraction does not occur at an interface between the first bonding layer 4 and the second base material 5 or an interface between the first bonding layer 4 and the lighting portion 3.

The second bonding layer 6 bonds the second surface 5b of the second base material 5 and the windowpane 8 together. The second bonding layer 6 may be initially provided as a constituent element of the lighting film 1 on the second surface 5b of the second base material 5 or may not be provided. If the second bonding layer 6 is not provided, the second bonding layer 6 may be supplied to the second surface 5b of the second base material 5 at the time of the work of attaching the lighting film 1 to the windowpane 8. For the second bonding layer 6, a common optical adhesive is used. The refractive index of the second bonding layer 6 is desirably equal to that of the second base material 5 or that of the windowpane 8. If the refractive index of the second bonding layer 6 is equal to that of the second base material 5 or that of the windowpane 8, refraction does not occur at an interface between the second bonding layer 6 and the second base material 5 or an interface between the second bonding layer 6 and the windowpane 8.

The lighting film 1 is attached to the windowpane 8 such that the lengthwise direction of the lighting portion 3 corresponds to a horizontal direction while the array direction of the plurality of lighting portions 3 corresponds to a vertical direction. Light reaching directly from the sun enters the lighting film 1 installed on the windowpane 8 obliquely from above. The light entering the lighting film 1 passes through the windowpane 8, the second bonding layer 6, the second base material 5, and the first bonding layer 4 and reaches the lighting portion 3.

For convenience of explanation, a point at which one given light ray of light entering the lighting portions 3 is incident on the lower side surface 3c (a reflective surface) of the lighting portion 3 is labeled as a point C. A virtual straight line which passes through the point C and is orthogonal to the first surface 2a of the first base material 2 is labeled as a straight line F. A space with light incident on the point C of two spaces with a horizontal plane including the straight line F as a boundary is labeled as a first space S1, and a space without the light incident on the point C is labeled as a second space S2.

Light L1 entering from the first end face 3a of the lighting portion 3 is totally reflected at, for example, the lower side surface 3c of the lighting portion 3, travels obliquely upward, that is, toward the first space S1, and is emitted from the lighting portion 3.

The light L1 emitted from the lighting portion 3 passes through the first base material 2, is scattered by the light scattering body 11 of the light scattering layer 7, and is emitted from the lighting film 1. Light L2 entering from the first bonding layer 4 on an upper side surface 3d of the lighting portion 3 through the void portion 9 enters, for example, the lower side surface 3c of the lighting portion 3 at an angle less than the critical angle. The light L2 is not reflected at the lower side surface 3c of the lighting portion 3, travels obliquely downward, that is, toward the second space S2, and is emitted from the lighting portion 3. The light L2 emitted from the lighting portion 3 is scattered by the light scattering body 11 of the light scattering layer 7 and is emitted from the lighting film 1.

Like the light L2 shown in FIG. 1, light which is emitted from the lighting film 1 and travels obliquely downward may reach the position of eyes of a person present in a room, that is, a so-called glare region to dazzle the person in the room. The glare region is a region defined on the basis of the position of eyes in a region where a person moves. More specifically, the glare region is a region which is, for example, 1 m or more away from a window-side wall and is a space region at a height of, for example, about 0.8 m to 1.8 m from a floor. Even in a case where the interior of a room is well illuminated with light traveling toward a ceiling, a person present in the room is likely to feel discomfort if a large quantity of light reaches the glare region.

In contrast, in the lighting film 1 according to the present embodiment, since the light scattering layer 7 is provided on a light emitting side of the first base material 2, light emitted from the first base material 2 is scattered by the light scattering layer 7 and decreases in intensity of light. For this reason, the intensity of light traveling obliquely downward from the lighting film 1 is lower than in a case without the light scattering layer 7, and a person present in a room is unlikely to be dazzled. The intensity of light traveling obliquely upward from the lighting film 1 is slightly lower. Since the light is scattered by the light scattering layer 7, an intensity distribution is homogenized, and a ceiling and wall surfaces in the room are more homogenously illuminated.

As described above, the lighting film 1 according to the present embodiment is capable of suppressing glare only by including the light scattering layer 7. The lighting film 1 can enhance comfort in a room at lower cost than a conventional technique which mechanically adjusts the opening degree of a blind.

Although colorless and transparent members are used as the first base material 2, the second base material 5, and the lighting portions 3 in the present embodiment, the colors of the first base material 10, the second base material 5, and the lighting portions 3 are not limited to this. For example, the first base material 2, the second base material 5, and the lighting portions 3 may be colored with, for example, a pale yellow, a pale orange, or a pale blue to adjust the color temperature of light to be let into a building. In light of designability and the like, some or all of the first base material 2, the second base material 5, and the lighting portions 3 may be colored with red, blue, or the like. This allows provision of a window like stained glass.

Although the lighting portion 3 is constructed as a member like a stripe with a fixed width in the present embodiment, the shape of the lighting portion 3 is not limited to this. If the plurality of lighting portions 3 have respective lengthwise directions in generally one direction and are arranged such that the lengthwise directions are parallel to one side of the first base material 2 with a rectangular shape, the same working effect as that of the present embodiment can be obtained. The expression "the plurality of lighting portions have respective lengthwise directions in generally one direction" means, for example, the case below. Light which diffuses isotropically, such as fluorescence, is made to enter into the first base material 2 from a side opposite to a side where the lighting portions 3 of the first base material 2 are formed, and a polar-angle brightness distribution of light emitted to outside the plurality of lighting portions 3 is measured. If a direction in which the brightness of light emitted from the plurality of lighting portions 3 is relatively high and a direction in which the brightness is relatively low are present, the expression "the lighting portions have the lengthwise directions in generally one direction" is used. A direction orthogonal to the direction, in which the brightness is relatively high, is defined as the "one direction".

Although the intervals between the lighting portions 3 are fixed in the present embodiment, the intervals between the lighting portions 3 need not be fixed. The plurality of lighting portions 3 may be arranged at irregular intervals adjacent to one another.

This configuration allows suppression of production of interference fringes which are produced if the lighting portions 3 are regularly formed. The plurality of lighting portions 3 need not be arranged at intervals, and adjacent ones of lighting portions 3 may be in contact with each other.

[Second Embodiment]

A second embodiment of the present invention will be described below with reference to FIG. 2.

A lighting film according to the present embodiment is the same in basic configuration as that in the first embodiment and is different only in the configuration of a first base material.

Figure 2:
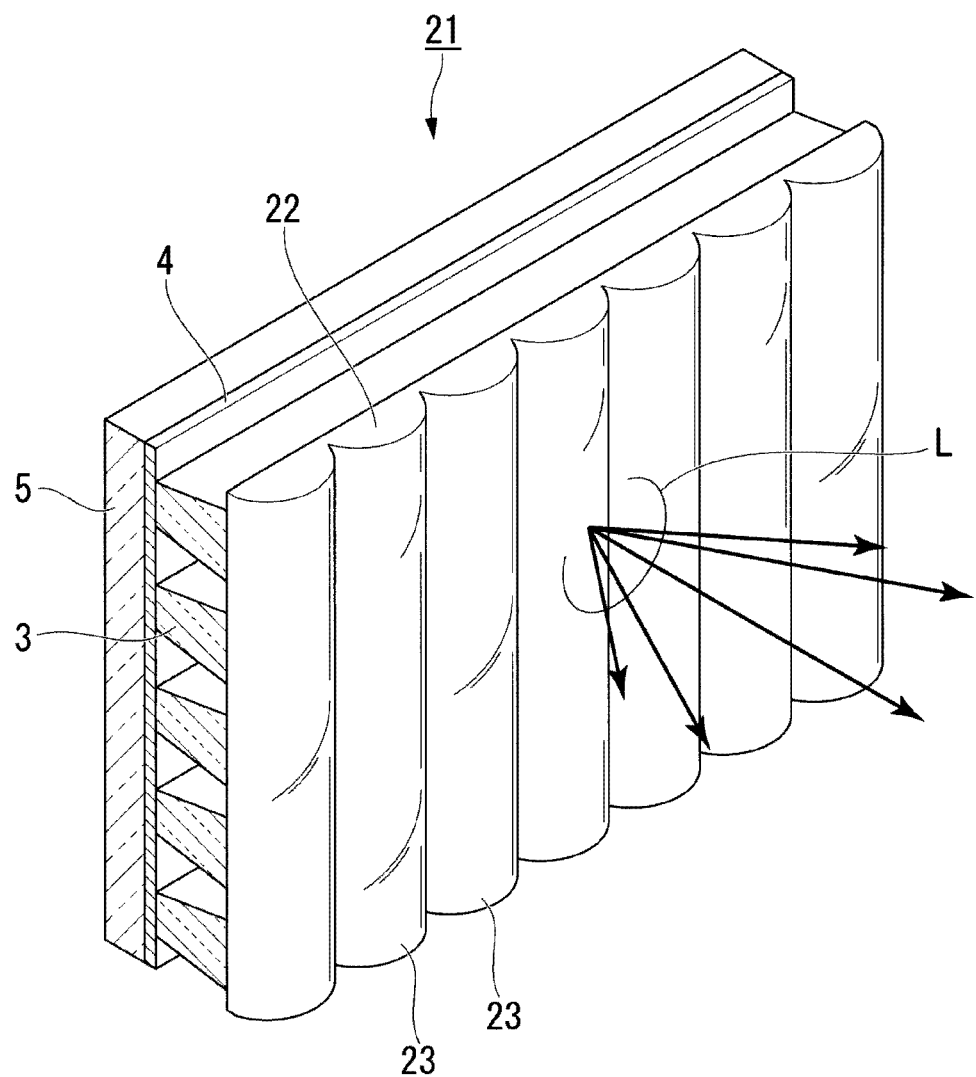
FIG. 2 is a perspective view showing a lighting film according to a second embodiment of the present invention.

FIG. 2 is a perspective view showing the lighting film according to the present embodiment.

In FIG. 2, the same constituent elements as those in the drawing used in the first embodiment are denoted by the same reference characters, and a description thereof will be omitted.

The lighting film 1 according to the first embodiment isotropically scatters light which is emitted from the first base material 2 in all directions. In contrast, a lighting film 21 according to the second embodiment anisotropically scatters light which is emitted from a first base material 2. In particular, the lighting film 21 according to the second embodiment strongly scatters light emitted from the first base material 22 in a horizontal direction.

As shown in FIG. 2, in the lighting film 21 according to the present embodiment, a plurality of convex lenses 23 which extend in a vertical direction and are parallel to one another are provided on a second surface of the first base material 22. In other words, a lenticular lens is provided on the second surface of the first base material 22. The second surface itself of the first base material 22 may be processed such that the convex lenses 23 are integral with the first base material 22. Alternatively, the convex lenses 23 may be separate from the first base material 22. The lighting film 21 according to the present embodiment does not include the light scattering layer 7 according to the first embodiment. Other constituent elements are the same as those in the first embodiment.

A lens surface of the convex lens 23 has a curvature in a horizontal plane but has no curvature in the vertical direction. The convex lens 23 has high light scattering ability in the horizontal direction and has no light scattering ability in the vertical direction. Thus, light L entering the first base material 22 from a lighting portion 3 is widely scattered in the horizontal direction when the light L is emitted from the convex lens 23 and is emitted without being scattered in the vertical direction while maintaining an angular distribution when the light L is emitted from the lighting portion 3. For this reason, the lighting film 21 according to the present embodiment is capable of suppressing glare without changing irradiation performance in a depth direction of a room.

Additionally, the lighting film 21 according to the present embodiment causes the light L emitted from the first base material 22 to be scattered in the horizontal direction and is thus capable of moderating a change in the irradiation performance associated with, for example, an azimuthal variation due to diurnal motion of the sun. This allows enhancement of the uniformity ratio in the horizontal direction of the lighting film 21.

Note that although the plurality of convex lenses 23 are provided on the second surface of the first base material 22 in the present embodiment, an anisotropic scatter structure may be provided on the second surface of the first base material instead. As the anisotropic scatter structure, a structure with asperities on the order of μm in a surface relief holographic pattern like, for example, a light diffusion control film (trade name: LSD) from Luminit, LLC can be used. Alternatively, a light scattering layer obtained by dispersing particles with aspect ratios of about 5 to 500 in a continuous layer may be used on the second surface of the first base material instead of an uneven structure.

[First Modification of Second Embodiment]

Figure 3:
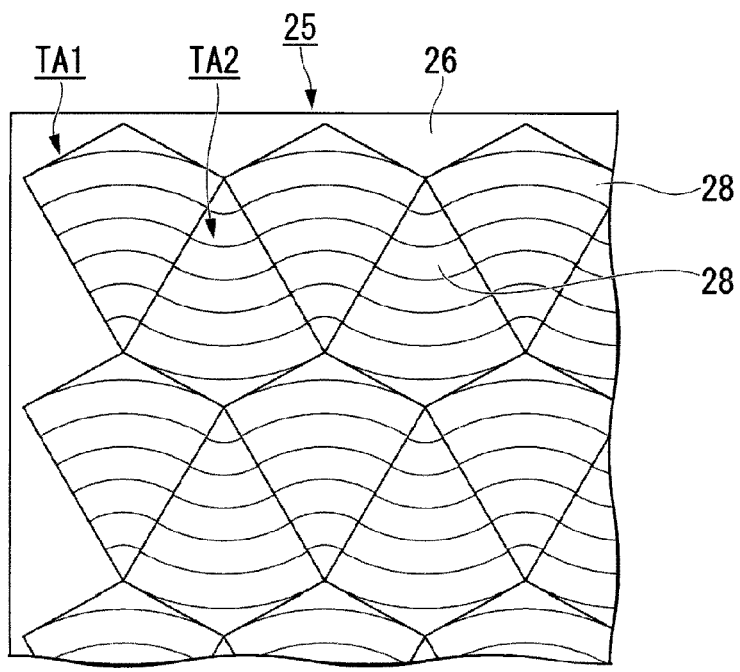
FIG. 3 is a plan view showing a first modification of the lighting film according to the second embodiment.

A lighting film 25 shown in FIG. 3 may be used instead of a lighting film including a plurality of lighting portions extending linearly.

In the lighting film 25 according to a first modification, a plurality of tiling regions TA1 and TA2 are provided on a second surface of a first base material 26, as shown in FIG. 3. In each of the plurality of tiling regions TA1 and TA2, a plurality of arc-like lighting portions 28 which are concentrically arranged as viewed from a normal direction of the first base material 26 are formed. The two adjacent tiling regions TA1 and TA2 are identical in the shapes of the lighting portions 28 in the tiling region but are different in a direction in which arcs are convex from each other.

In the present embodiment, the plurality of tiling regions TA1 and TA2 include two types of tiling regions. The first tiling region TA1 and the second tiling region TA2 each have the shape of a quadrangle. More specifically, the quadrangle has two sets of two adjacent sides of equal length. In the present embodiment, a quadrangle with four internal angles of 120°, 90°, 60°, and 90° is adopted.

In each of the first tiling region TA1 and the second tiling region TA2, a plurality of (six in the present embodiment) concentric lighting portions 28 about a vertex with an internal angle of 60° are formed. The cross-sectional shape of the lighting portion 28 is a trapezoidal shape with the area of a light emitting end face larger than the area of a light incoming end face. In the first base material 26, a plurality of lighting portions 28 equal in cross-sectional shape are concentrically arranged at fixed intervals.

The shapes of the first tiling region TA1 and the second tiling region TA2 are the same except that the shapes are vertically reverse to each other such that the shapes are opposite in a direction in which arcs are convex. The first tiling regions TA1 and the second tiling regions TA2 are arranged on one surface of the first base material 26 without any clearance between the tiling regions.

In the lighting film 25 according to the first modification, the lighting portion 28 is curved, and an extending direction of the lighting portion 28 varies in one tiling region TA1 or TA2. This configuration causes light emitted from the lighting portion 28 to be scattered in a horizontal direction and allows suppression of glare. Like the above-described embodiment, the uniformity ratio in the horizontal direction of the lighting film 25 can be enhanced.

[Second Modification of Second Embodiment]

Figure 4:
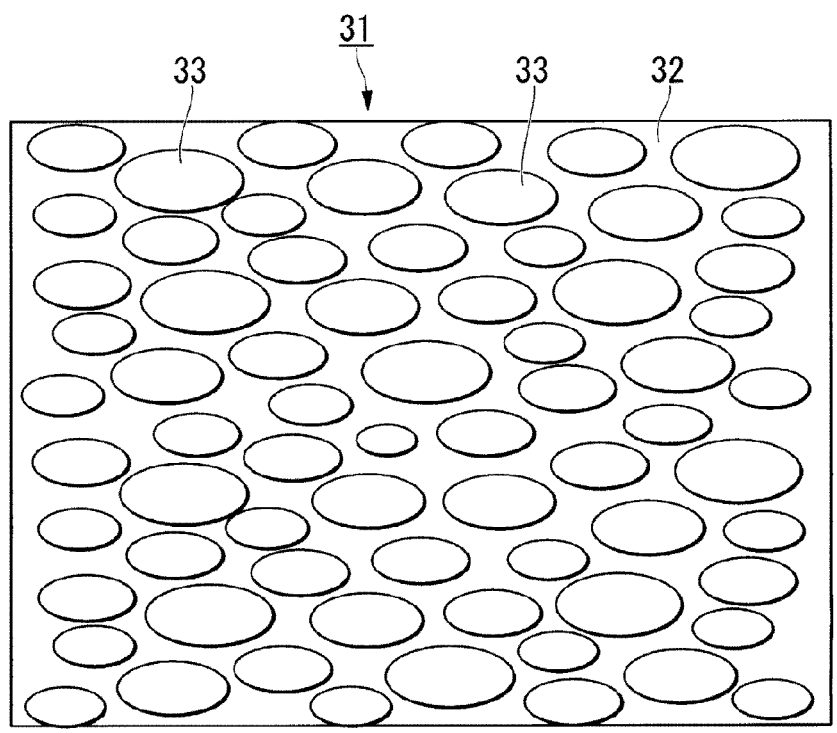
FIG. 4 is a plan view showing a second modification of the lighting film according to the second embodiment.

A lighting film 31 shown in FIG. 4 may be used instead of a lighting film including a plurality of lighting portions extending like stripes.

As shown in FIG. 4, in the lighting film 31 according to a second modification, a first base material 32 includes a plurality of lighting portions 33 with the shapes of truncated elliptical cones. Although the dimensions of the plurality of lighting portions 33 are different in the example in FIG. 4, the dimensions may be the same. The plurality of lighting portions 33 are randomly arranged but may be regularly arranged. In either case, the plurality of lighting portions 33 are arranged with a major axis direction of an ellipse forming a contour of each lighting portion 33 facing in a horizontal direction and a minor axis direction of the ellipse facing in a vertical direction when the plurality of lighting portions 33 are viewed from a normal direction of the first base material 32.

In the lighting film 31 according to the second modification, the planar shape of the lighting portion 33 is an elliptical shape, and a reflective surface of the lighting portion 33 is curved. This configuration causes light emitted from the lighting portion 33 to be scattered in the horizontal direction and allows suppression of glare. Additionally, the uniformity ratio in the horizontal direction of the lighting film 31 can be enhanced, like the above-described embodiment.

[Third Embodiment]

A third embodiment of the present invention will be described below with reference to FIG. 5.

A lighting film according to the present embodiment is the same in basic configuration as that in the first embodiment and is different only in the configuration of a first base material.

Figure 5:
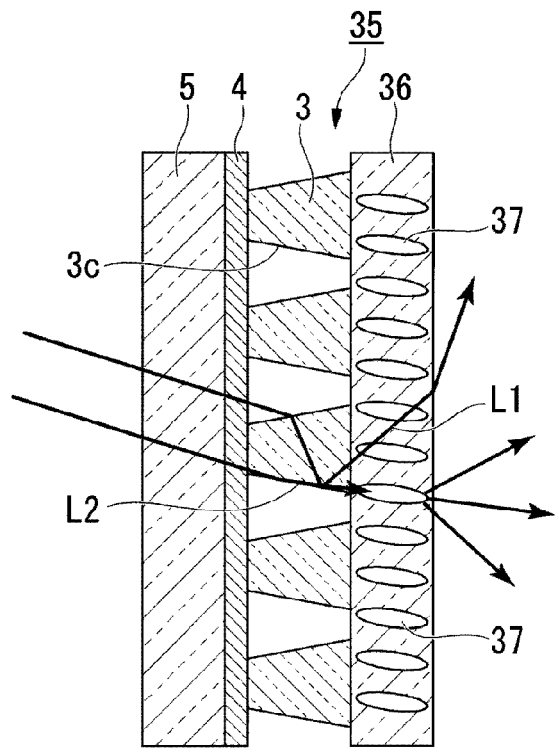
FIG. 5 is a cross-sectional view showing a lighting film according to a third embodiment of the present invention.

FIG. 5 is a cross-sectional view showing the lighting film according to the present embodiment.

In FIG. 5, the same constituent elements as those in the drawing used in the first embodiment are denoted by the same reference characters, and a description thereof will be omitted.

A lighting film 35 according to the third embodiment anisotropically scatters light emitted from a first base material 36, as in the second embodiment. Note that, in contrast to the lighting film 21 according to the second embodiment that strongly scatters light emitted from the first base material 22 in the horizontal direction, the lighting film 35 according to the third embodiment strongly scatters light heading obliquely downward of light emitted from the first base material 36.

As shown in FIG. 5, in the lighting film 35 according to the present embodiment, the first base material 36 contains a plurality of minute pieces 37 having a refractive index different from that of the first base material 36.

The minute piece 37 is a rod-like or plate-like minute particle having a lengthwise direction and a widthwise direction. The plurality of minute pieces 37 are oriented such that the lengthwise direction faces generally obliquely downward. If the first base material 36 contains the minute piece 37 of this type, light L2 traveling along the lengthwise direction of the minute piece 37 is scattered due to the action of the minute piece 37.

In contrast, light L1 traveling along a direction which intersects the lengthwise direction of the minute piece 37 passes without being affected by the minute pieces 37. That is, the first base material 36 has an anisotropic scattering function of selectively and strongly scattering light heading obliquely downward. Note that a film having a function of scattering light heading obliquely downward, such as an anisotropic scattering film like, for example, Lumisty (which is a trade name and is manufactured by Sumitomo Chemical Company, Limited) may be attached to a second surface of the first base material, instead of the configuration, in which the first base material 36 contains the plurality of minute pieces 37. The lighting film 35 according to the present embodiment does not include the light scattering layer 7 according to the first embodiment. Other constituent elements are the same as those in the first embodiment.

The lighting film 35 according to the present embodiment has high light scattering ability for light heading obliquely downward and has no light scattering ability for light heading upward. For this reason, use of the lighting film 35 according to the present embodiment allows suppression of glare without changing irradiation performance in a direction toward a room ceiling.

[Fourth Embodiment]

A fourth embodiment of the present invention will be described below with reference to FIG. 6.

A lighting film according to the fourth embodiment is the same in basic configuration as that in the first embodiment and is different from the first embodiment in that a louver is added to a first base material.

Figure 6:
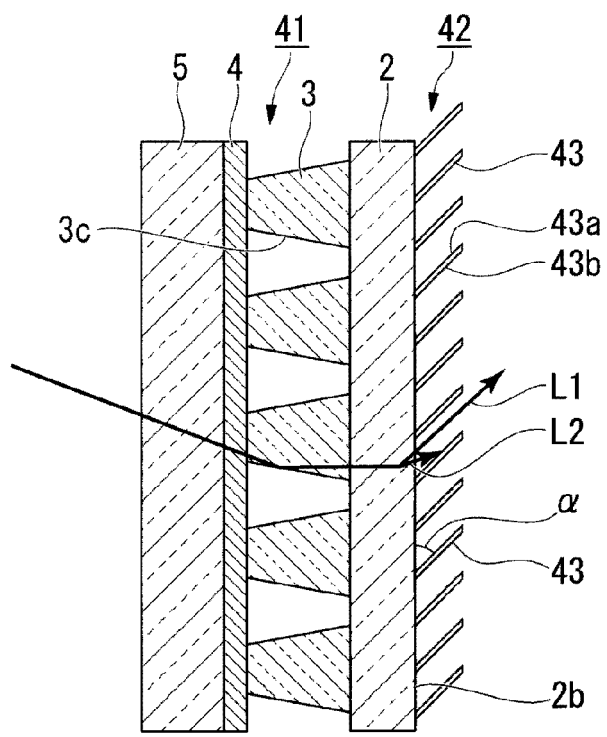
FIG. 6 is a cross-sectional view showing a lighting film according to a fourth embodiment of the present invention.

FIG. 6 is a cross-sectional view showing the lighting film according to the fourth embodiment.

In FIG. 6, the same constituent elements as those in the drawing used in the first embodiment are denoted by the same reference characters, and a description thereof will be omitted.

As shown in FIG. 6, a lighting film 41 according to the present embodiment has a louver 42 which is provided on a second surface 2b of a first base material 2. The louver 42 is composed of a plurality of elongated rectangular plate materials 43 (light absorbing members). An extending direction of the plurality of plate materials 43 is parallel to an extending direction of the lighting portions 3 (a direction perpendicular to the sheet surface of FIG. 6). A lower end of the plate material 43 is fixed to the second surface 2b of the first base material 2, and an upper end side of the plate material 43 extends obliquely upward from the lower end. That is, an angle α which the second surface 2b of the first base material 2 forms with an upper surface 43a of the plate material 43 is an acute angle less than 90°. Of two surfaces of the plate material 43, at least the upper surface 43a is, for example, black and has light absorbency. Additionally, a lower surface 43b of the plate material 43 may have light absorbency.

Light L1 reflected at a lower side surface 3c of the lighting portion 3 travels obliquely upward and is unlikely to hit the obliquely arranged plate material 43. Thus, the light L1 travels in a direction toward a ceiling without significantly changing a traveling direction. In contrast, light L2 emitted in a direction close to a horizontal direction or obliquely downward from the first base material 2 hits the upper surface 43a of the plate material 43 and is absorbed by the upper surface 43a. For this reason, the light L2 traveling in the direction close to the horizontal direction or obliquely downward decreases in intensity. As described above, the lighting film 41 according to the present embodiment allows suppression of glare without significantly changing irradiation performance in the direction toward the room ceiling. An angular range for the light L1 that passes through the lighting film 41 can be adjusted by changing the angle α which the first base material 2 forms with the plate material 43 and the dimensions of the plate material 43.

In the present embodiment, the plate material 43 is configured such that the surfaces have light absorbency. Instead of this, the surfaces of the plate material may have light reflectiveness. If a plate material (light reflecting member) having light reflectiveness is used, light emitted from the first base material in a direction close to the horizontal direction or obliquely downward is reflected at an upper surface of the plate material and heads upward. With this configuration, it is possible to enhance the brightness of a room while suppressing glare. Note that reflection on a surface of a plate material is desirably diffuse reflection. This is because, if reflection on a surface of a plate material is specular reflection, intense reflective light may travel downward to cause glare. In that context, if a plate material has light reflectiveness, only an upper surface of the plate material desirably has light reflectiveness. Alternatively, an upper surface of a plate material may have light reflectiveness, and a lower surface of the plate material may have light absorbency.

[Fifth Embodiment]

A fifth embodiment of the present invention will be described below with reference to FIG. 7.

A lighting device according to the fifth embodiment includes the same lighting film as that in the first embodiment.

Figure 7:
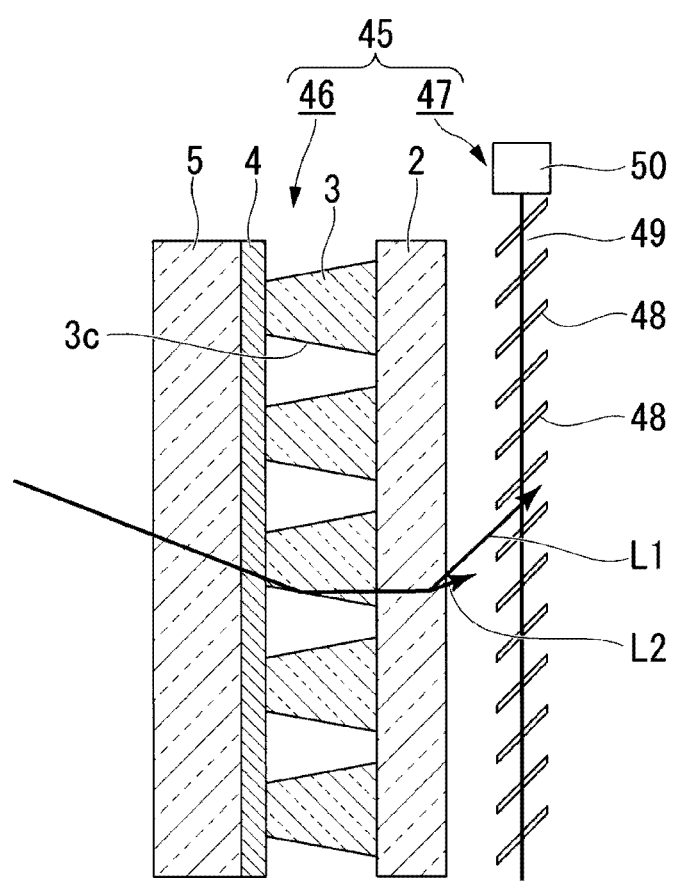
FIG. 7 is a cross-sectional view showing a lighting device according to a fifth embodiment of the present invention.

FIG. 7 is a cross-sectional view showing the lighting device according to the fifth embodiment.

In FIG. 7, the same constituent elements as those in the drawing used in the first embodiment are denoted by the same reference characters, and a description thereof will be omitted.

As shown in FIG. 7, a lighting device 45 according to the present embodiment includes a lighting film 46 and a blind 47 (a light attenuating member). Although the configuration of the lighting film 46 is the same as that in the first embodiment, the lighting film 46 according to the present embodiment does not include the light scattering layer 7. In the present embodiment, the blind 47 plays a function of suppressing glare. The blind 47 includes a plurality of slats 48, a ladder cord 49, and a support member 50. The slat 48 is an elongated plate material having light absorbency or light scattering ability, and the slats 48 are configured such that the angle thereof is changed by operating the ladder cord 49. The plurality of slats 48 and the ladder cord 49 are supported by the support member 50.

As in the fourth embodiment, the lighting device 45 according to the present embodiment can cause light L2 traveling in a direction close to a horizontal direction or obliquely downward to decrease in intensity without greatly affecting light L1 heading obliquely upward by adjusting the angle of the plurality of slats 48 such that the slats 48 face in an oblique direction. Thus, the lighting device 45 according to the present embodiment can suppress glare without significantly changing irradiation performance in a direction toward a room ceiling. An angular range for light which passes through the lighting device 45 can be adjusted by changing the angle of the slats 48 of the blind 47.

[Sixth Embodiment]

A sixth embodiment of the present invention will be described below with reference to FIG. 8.

A lighting device according to the sixth embodiment includes the same lighting film as that in the first embodiment.

Figure 8:
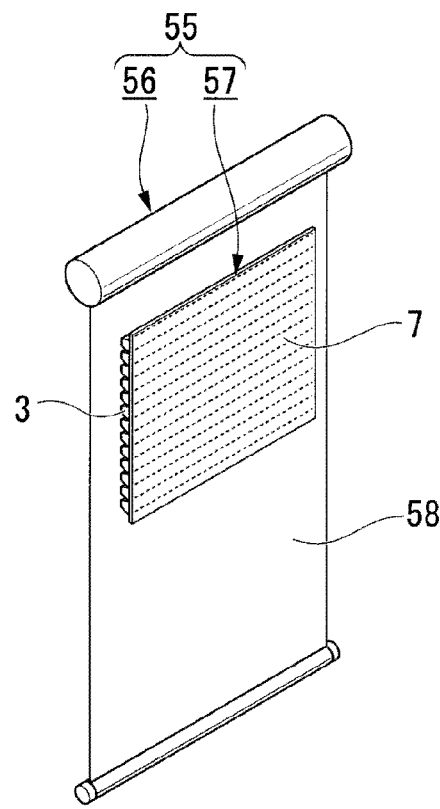
FIG. 8 is a perspective view showing a lighting device according to a sixth embodiment of the present invention.

FIG. 8 is a cross-sectional view showing the lighting device according to the sixth embodiment.

In FIG. 8, the same constituent elements as those in the drawing used in the first embodiment are denoted by the same reference numerals, and a description thereof will be omitted.

As shown in FIG. 8, a lighting device 55 according to the present embodiment includes a rolling screen 56 and a lighting film 57. An opening portion (not shown) is formed in part of a light shielding cloth 58 constituting the rolling screen 56, and the lighting film 57 as that in the first embodiment is built in at the position of the opening portion. For example, if one side of a 2.7-m-high room constitutes a window, and the length of the light shielding cloth 58 when the rolling screen 56 is stretched to the utmost limit is approximately 2.7 m, the lighting film 57 is arranged at a height of more than 1.8 m from a floor surface. That is, the lighting film 57 is arranged at a height generally greater than a line of sight of a person present in the room.

In the lighting device 55 according to the present embodiment, the lighting film 57 is arranged at a high height, which allows more effective suppression of glare. Since a lower portion of the window is covered with the light shielding cloth 58, the privacy of the room can be protected.

The example of the lighting device 55, in which the lighting film 57 is built in part of the rolling screen 56, has been illustrated. Even in a case where the lighting film is attached directly to the window, as in the first embodiment, an installation method that arranges the lighting film such that a lower side surface of a lighting portion faces downward in a vertical direction and attaches the lighting film to only an upper portion of the window may be adopted. With the adoption, it is possible to effectively suppress glare while securing lighting performance for a room ceiling to some extent.

Note that the technical scope of the present invention is not limited to the above-described embodiments and that various changes may be made without departing from the spirit of the present invention. For example, the first embodiment has illustrated a case where a light scattering layer is provided on an outer side of a second surface of a first base material. However, any member among a first base material, a lighting portion, a first bonding layer, a second base material, and a second bonding layer may be provided with light scattering ability using a method, such as mixing minute particles different in refractive index into the member. Note that it is more desirable in terms of minimizing effects on ceiling irradiation performance to provide a member closer to a light emitting side with light scattering ability.

The above-described embodiments have each illustrated a case where light is made incident from a first end face, that is, an end face with a smaller area of a lighting portion. In contrast, light may be made incident from a second end face, that is, an end face with a larger area of a lighting portion. Additionally, the cross-sectional shape of a lighting portion is not limited to a trapezoid. The shape may be a quadrangle or a triangle other than a trapezoid, and one of other various shapes may be adopted. In addition, a specific configuration, such as a material, a shape, and dimensions, of each constituent element illustrated in the embodiments may be appropriately changed.

EXAMPLES

Glare is divided into disability glare which refers to a phenomenon in which a high-intensity light source close to a line of sight makes a visual object less invisible and discomfort glare which causes psychological discomfort. Since general offices are less likely to have a light source which may cause disability glare, emphasis is placed on measures against discomfort glare. Discomfort glare can be quantitatively expressed on the basis of the luminance of a light source, the size of the light source, the position of the light source, or the brightness of the background, such as a ceiling surface or a wall surface. One of indexes of discomfort glare is the unified glare rating (UGR) as a standard adopted by the International Commission on Illumination (CIE).

Letting Lb [cd/m$^2$] be background luminance; L [cd/m$^2$] be the luminance of a light emitting portion of illumination with respect to a direction of eyes of an observer; ω [sr] be the solid angle of the light emitting portion of the illumination in a field of view of the observer; and P be the position index of the illumination, UGR is represented by Expression (1) below:

$$\text{UGR}=8\times\log\{(0.25/Lb)\times\Sigma(L^2\omega/P^2)\} \tag{1}$$

The present inventors demonstrated a glare-reduction effect of a lighting film according to the present embodiment by a simulation using UGR described above. A result of the simulation will be described below.

Figure 9:
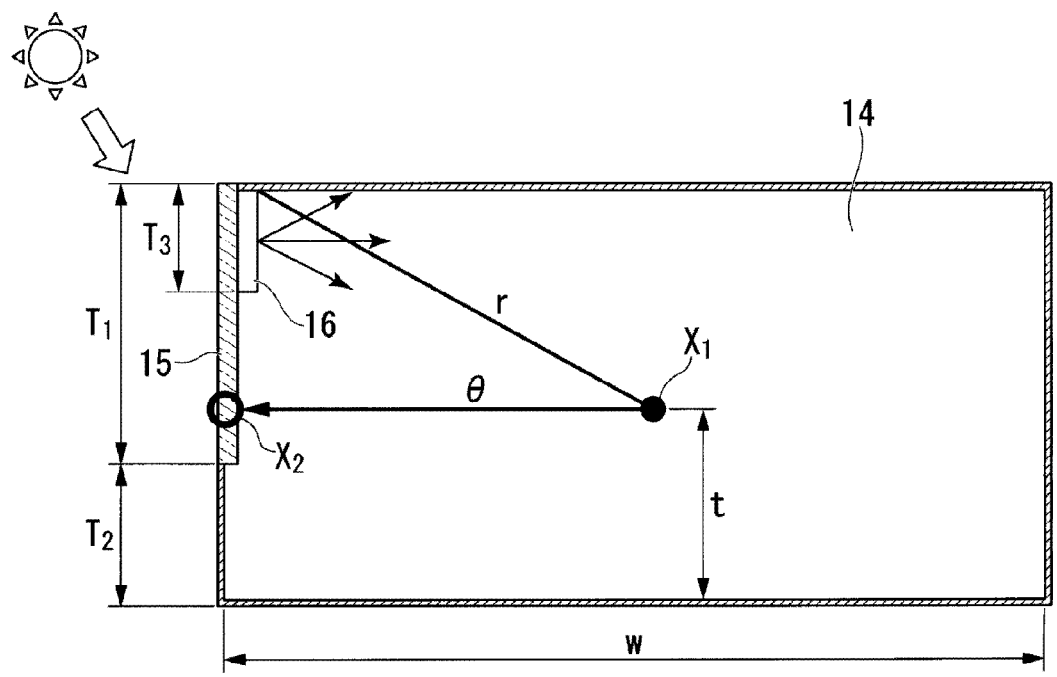
FIG. 9 is a cross-sectional view of the interior of a room as an example at the time of calculating an index of glare.

As shown in FIG. 9, a south-facing room 14 with a depth w of 16 m was taken as a simulation condition. A window 15 at a fixed height was arranged on the south side of the room 14, and a lighting film 16 was installed so as to cover an upper third of the window 15. Specifically, a height from a floor surface to a ceiling of the room 14 was set at 2.7 m, a height T1 from a lower end of the window 15 to an upper end (the ceiling) was set at 1.8 m, and a height T2 from the floor surface to the lower end of the window 15 was set at 0.9 m. A dimension T3 in a height direction of the lighting film 16 was set at 0.6 m, and an upper end of the lighting film 16 was aligned with the upper end of the window 15. The culmination altitude of the sun was set at 55°.

As to the quantity of sunlight, horizontal direct solar irradiance was set at 2.37 MJ/m$^2$/h, and horizontal diffuse solar irradiance was set at 0.62 MJ/m$^2$/h. These solar irradiances each correspond to solar irradiance in Tokyo at 12 a.m. on March 16 in average year. Each solar irradiance on a horizontal plane was converted into solar irradiance on a window surface. Window direct solar irradiance was 50849 lm/m$^2$, and window diffuse solar irradiance was 9499 lm/m$^2$.

As to the intensity of sunlight, the apparent diameter of the sun corresponding to spread of direct solar radiation light was set at 0.52 deg., and a light source for direct solar radiation, having a distance d of 1.5×10$^8$ km and a radius r of 7×10$^5$ km, which re-created the apparent diameter was prepared. A uniform-intensity light source for diffuse solar radiation was also separately prepared.

Figure 10:
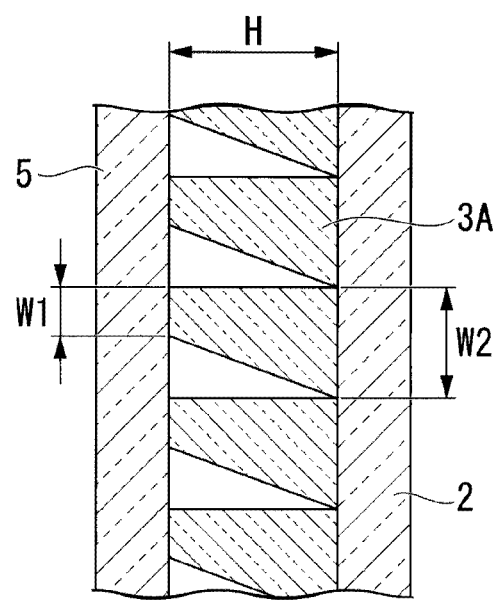
FIG. 10 is a view showing a model of a lighting film used for calculation.

An observation position X1 for calculating UGR was set at a position 8 m from the window at the center of the room. At the position 8 m from the window, UGR was calculated for three types of models, a model according to a comparative example in which a lighting film had no light scattering ability, a model according to Example 1 in which a lighting film had isotropic scattering, and a model according to Example 2 in which a lighting film had anisotropic scattering. As a calculation condition common to the three types of models, a lighting film shown in FIG. 10 was taken. A width W1 of a first end face of a lighting portion 3A was set at 13.4 µm, and a width W2 of a second end face was set at 30 µm. A height H of the lighting portion 3A was set at 45 µm.

The model according to Example 1 was set such that isotropic Gaussian scattering, having a standard deviation of 15° for a brightness distribution at the time of scattering parallel light, was imparted to a light emitting surface. The model according to Example 2 was set such that anisotropic Gaussian scattering, having a standard deviation of 5° in a vertical direction and a standard deviation of 60° in a horizontal direction for a brightness distribution at the time of scattering parallel light, was imparted to a light emitting surface. Note that, at the time of UGR calculation, UGR was calculated while dividing the window and regarding the window as a collection of small light sources.

Figure 11:
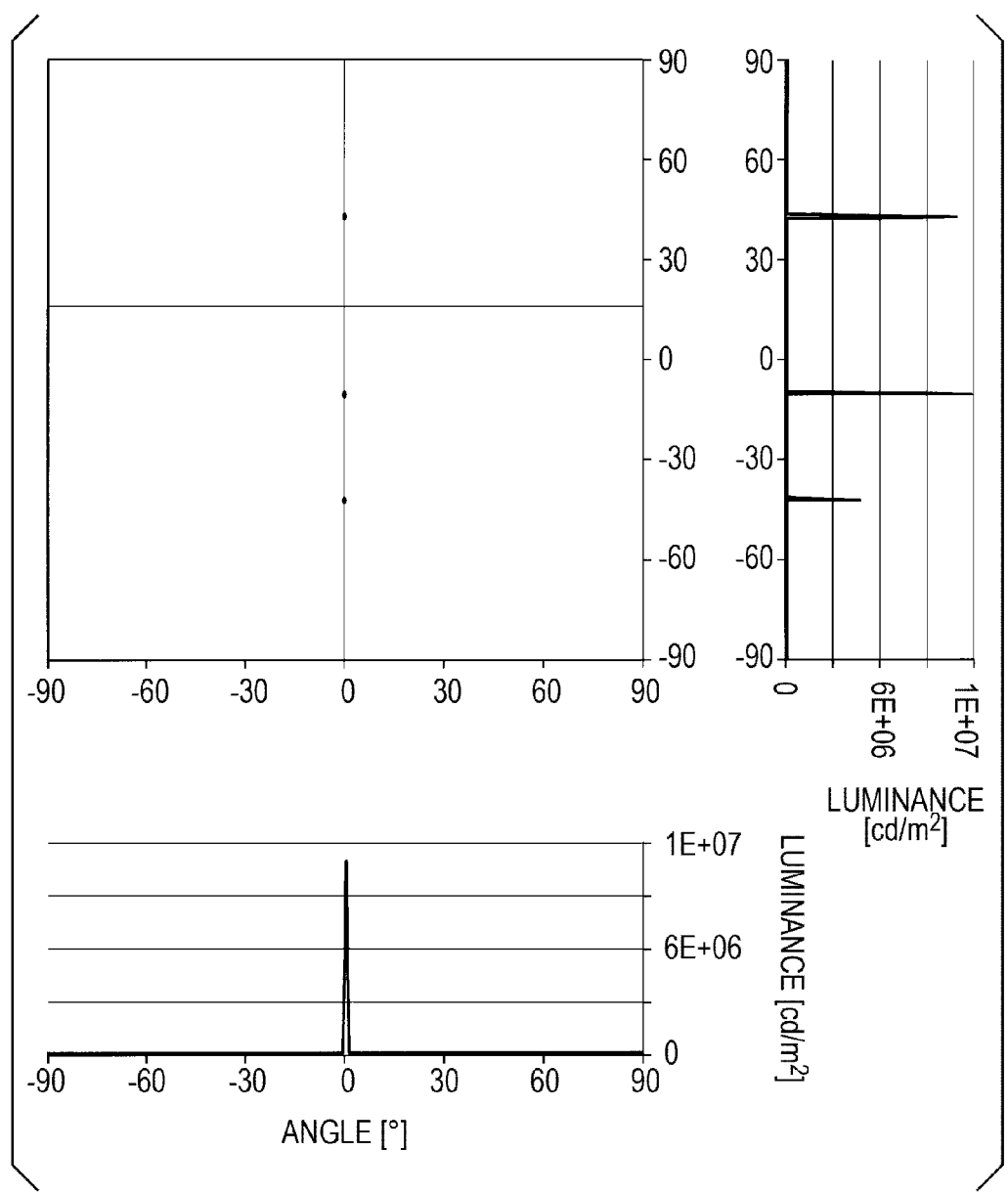
FIG. 11 is a figure showing a result of simulating a brightness distribution using a model without a scattering function.

FIG. 11 is a figure showing a brightness distribution at a lighting surface in the model according to the comparative example. In an upper-left brightness distribution chart, the abscissa represents an angle [°] in a horizontal direction while the ordinate represents an angle [°] in a vertical direction. A lower-left graph is a graph of a brightness distribution in the horizontal direction, and an upper-right graph is a graph of a brightness distribution in the vertical direction.

As a result of calculating UGR for the model according to the comparative example, UGR at the position 8 m from the window was 40.1. An observer feels more discomfort with glare with an increase in the value of UGR and feels less discomfort with glare with a decrease in the value of UGR. According to a criterion for a general office, UGR is required to be not more than 19. Thus, the value of UGR for the model according to the comparative example at the position 8 m from the window greatly exceeds the criterion for a general office. This is estimated to be attributed to discomfort glare due to direct solar radiation like the light L2 shown in FIG. 1.

Figure 12:
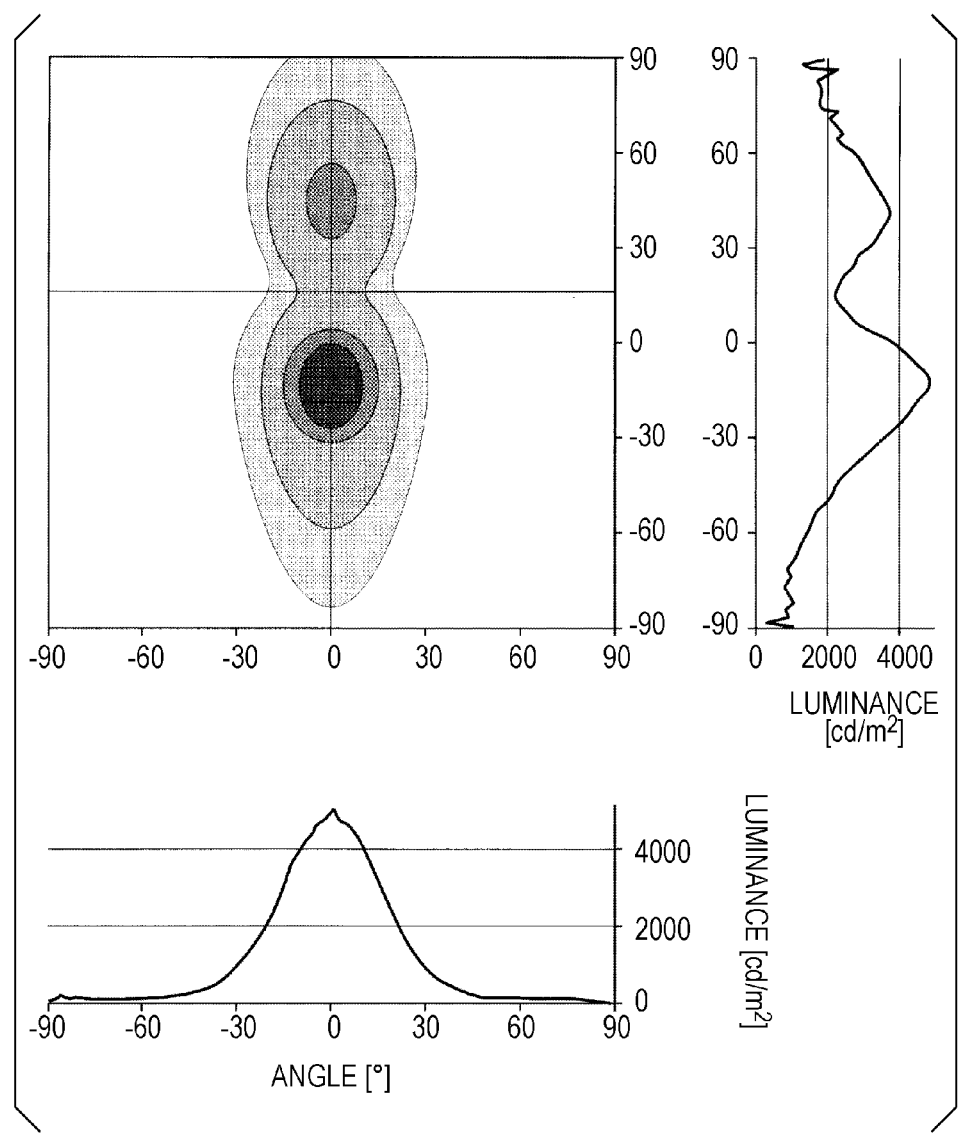
FIG. 12 is a figure showing a result of simulating a brightness distribution using a model with an isotropic scattering function.

FIG. 12 is a figure showing a brightness distribution at a lighting surface in the model according to Example 1. In an upper-left brightness distribution chart, the abscissa represents an angle [°] in the horizontal direction while the ordinate represents an angle [°] in the vertical direction. A lower-left graph is a graph of a brightness distribution in the horizontal direction, and an upper-right graph is a graph of a brightness distribution in the vertical direction. Since isotropic scattering was imparted to the lighting film, maximum luminance was much lower than that in the model according to the comparative example.

As a result of calculating UGR for the model according to Example 1, the value of UGR at the position 8 m from the window was 18.5, which exhibited a large improvement over 40.1 that was the value of UGR for the model according to the comparative example.

The model according to Example 1 meets the criterion for a general office. As described above, it has been demonstrated that impartment of isotropic scattering to a lighting film allows suppression of glare.

Figure 13:
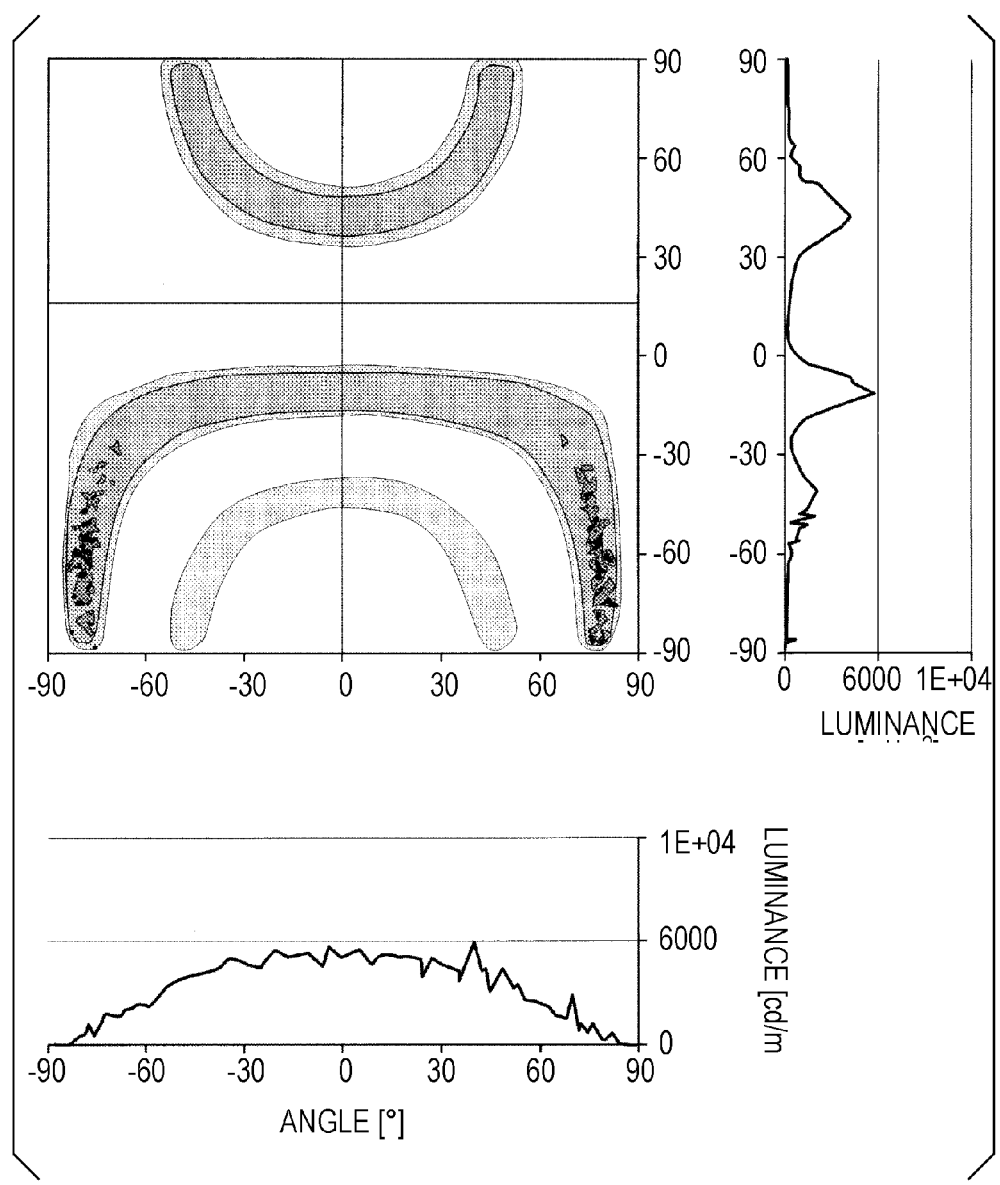
FIG. 13 is a figure showing a result of simulating a brightness distribution using a model with an anisotropic scattering function.

FIG. 13 is a figure showing a brightness distribution at a lighting surface in the model according to Example 2. In an upper-left brightness distribution chart, the abscissa represents an angle [°] in the horizontal direction while the ordinate represents an angle [°] in the vertical direction. A lower-left graph is a graph of a brightness distribution in the horizontal direction, and an upper-right graph is a graph of a brightness distribution in the vertical direction. Since anisotropic scattering was imparted to the lighting film, maximum luminance was much lower than that in the model according to the comparative example.

As a result of calculating UGR for the model according to Example 2, the value of UGR at the position 8 m from the window was 18.3, which exhibited a large improvement over 40.1 that was the value of UGR for the model according to the comparative example.

The model according to Example 2 meets the criterion for a general office. As described above, it has been demonstrated that impartment of anisotropic scattering to a lighting film allows suppression of glare. It has been found that impartment of anisotropic scattering having high scattering ability, particularly in the horizontal direction, to a lighting film allows a reduction in glare without largely affecting a ceiling illuminance distribution.

Note that the calculated UGR values are illustrative only and that the UGR value for the model according to each example can be optimized by, for example, appropriately changing the shape of a lighting portion and the level of light scattering ability.

[Illumination Dimming System]

Figure 14:
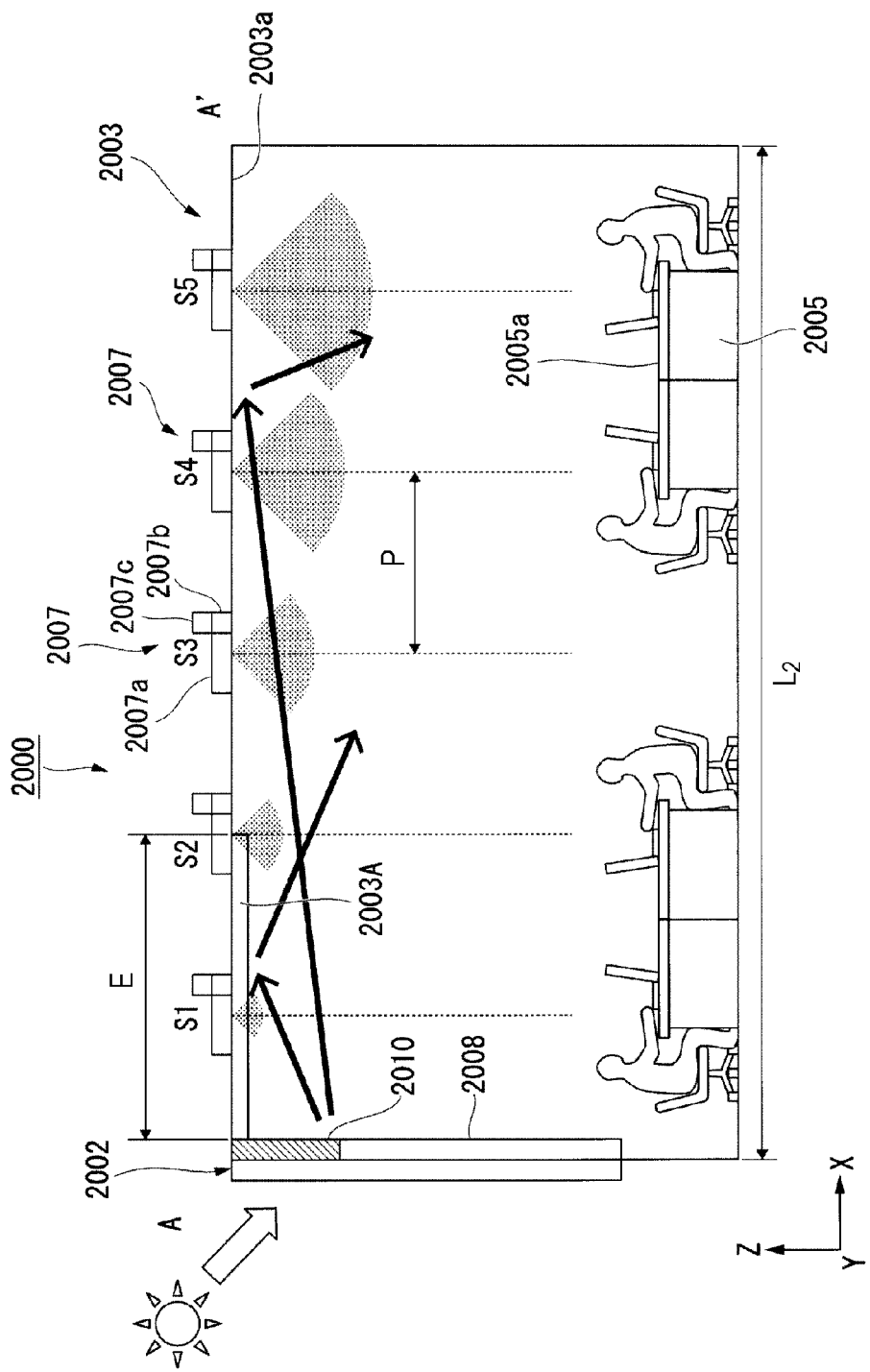
FIG. 14 is a view showing a room model 2000 including a lighting apparatus and an illumination dimming system.

FIG. 14 is a view showing a room model 2000 including a lighting apparatus and an illumination dimming system.

Figure 15:
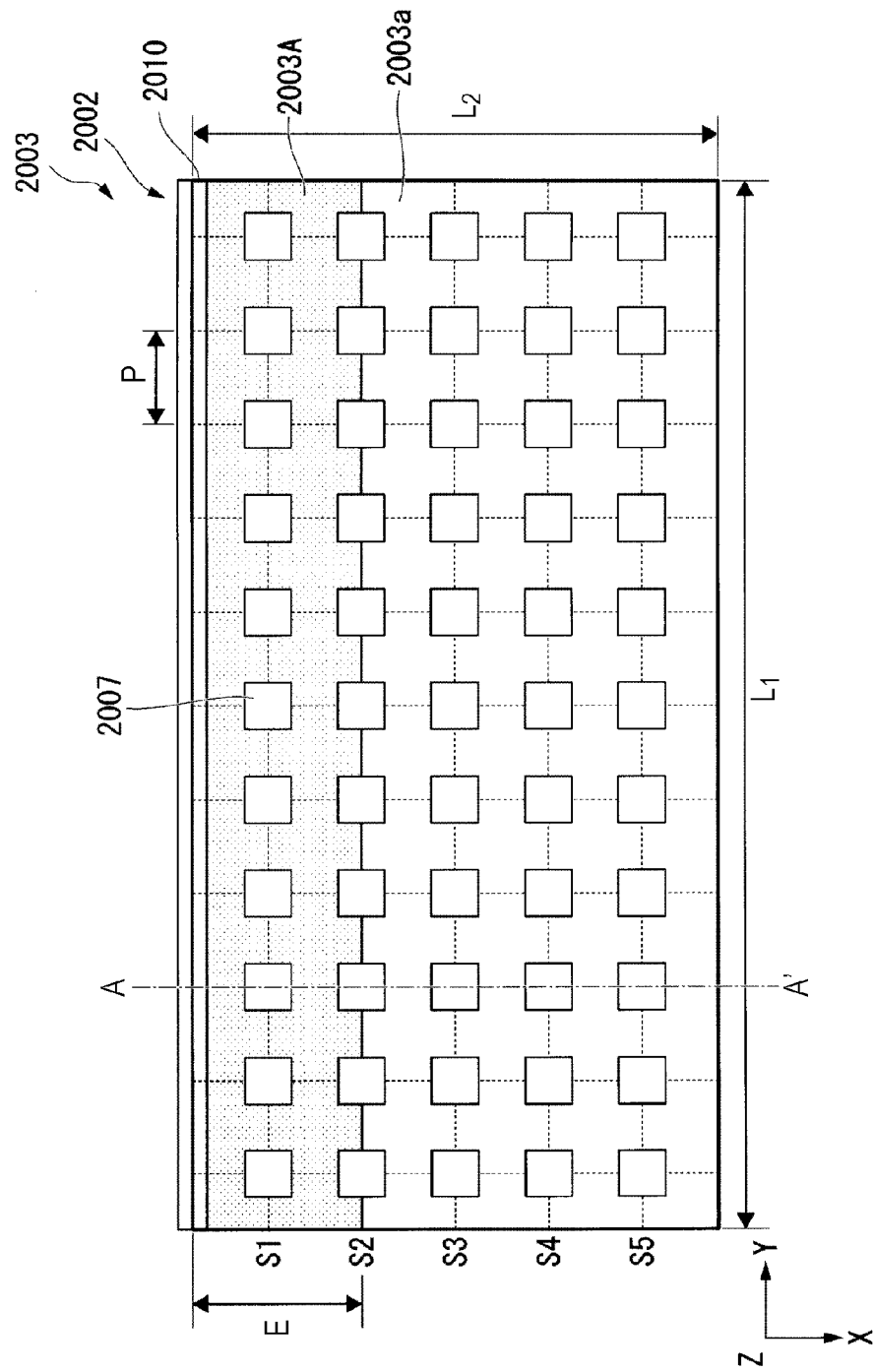
FIG. 15 is a plan view showing a ceiling of the room model 2000.

FIG. 15 is a plan view showing a ceiling of the room model 2000.

In the present invention, a constituent ceiling material for a ceiling 2003a of a room 2003 which lets outside light be introduced may have high light reflectiveness. As shown in FIGS. 14 and 15, an optically reflective ceiling member 2003A is installed as a ceiling material having light reflectiveness on the ceiling 2003a of the room 2003. The optically reflective ceiling member 2003A is intended to promote introduction of outside light from a lighting apparatus 2010, which is installed on a window 2002, into the back of the room and is installed on a window-side portion of the ceiling 2003a. Specifically, the optically reflective ceiling member 2003A is installed in a predetermined region E (a region about 3 m wide extending from the window 2002) of the ceiling 2003a.

As described earlier, the optically reflective ceiling member 2003A functions to effectively guide outside light introduced into the room via the window 2002, on which the lighting apparatus 2010 according to the present invention (a lighting apparatus according to any of the above-described embodiments) is installed, into the back of the room. Outside light introduced from the lighting apparatus 2010 toward the ceiling 2003a in the room is reflected at the optically reflective ceiling member 2003A, turns, and illuminates a desk upper surface 2005a of a desk 2005 which is placed at the back of the room. The optically reflective ceiling member 2003A exerts the effect of brightening the desk upper surface 2005a.

The optically reflective ceiling member 2003A may have diffuse reflectiveness or specular reflectiveness. The optically reflective ceiling member 2003A preferably has an appropriate mixture of the properties to juggle the effect of brightening the desk upper surface 2005a of the desk 2005 placed at the back of the room and the effect of suppressing glare light uncomfortable for a person present in the room.

Most of light introduced into the room by the lighting apparatus 2010 according to the present invention heads toward a portion near the window 2002 of the ceiling. The quantity of light is often sufficient in the vicinity of the window 2002. For this reason, part of light incident on the portion near the window (the region E) of the ceiling can be distributed to the back of the room that is smaller in light quantity than the window side through concurrent use of the optically reflective ceiling member 2003A as described above.

The optically reflective ceiling member 2003A can be prepared by, for example, embossing a metal plate of, for example, aluminum, with asperities about several tens of micrometers deep or evaporating a thin metal film of, for example, aluminum onto a surface of a resin substrate with similar asperities. Alternatively, asperities formed through embossing may be formed to have a longer-period curved surface.

A light distribution characteristic and a light distribution in the room can be controlled by appropriately changing the shape of an embossed pattern to be formed at the optically reflective ceiling member 2003A. For example, if the optically reflective ceiling member 2003A is embossed like stripes extending at the back of the room, light reflected at the optically reflective ceiling member 2003A spreads in a left-right direction of the window 2002 (a direction intersecting a lengthwise direction of asperities). In a case where the size and orientation of the window 2002 of the room 2003 are limited, the above-described property can be used to spread light in a horizontal direction by the optically reflective ceiling member 2003A and reflect the light in a direction toward the back of the room.

The lighting apparatus 2010 according to the present invention is used as part of an illumination dimming system of the room 2003. The illumination dimming system is composed of constituent members across the room including, for example, the lighting apparatus 2010, a plurality of interior illumination apparatuses 2007, a solar radiation adjustment apparatus 2008 which is installed on the window, a control system 2009 for these components, and the optically reflective ceiling member 2003A installed on the ceiling 2003a.

At the window 2002 of the room 2003, the lighting apparatus 2010 is installed on an upper side while the solar radiation adjustment apparatus 2008 is installed on a lower side. Although a blind is installed as the solar radiation adjustment apparatus 2008 here, the present invention is not limited to this.

In the room 2003, the plurality of interior illumination apparatuses 2007 are arranged in a grid pattern in the left-right direction (a Y direction) of the window 2002 and in a depth direction (an X direction) of the room. The plurality of interior illumination apparatuses 2007 together with the lighting apparatus 2010 constitute an illumination system for the whole of the room 2003.

As shown in FIGS. 14 and 15, for example, the ceiling 2003a of an office having a length L1 in the left-right direction (Y direction) of the window 2002 of 18 m and a length L2 in the depth direction (X direction) of the room 2003 of 9 m is shown. The interior illumination apparatuses 2007 are arranged in a grid pattern at intervals P of 1.8 m in a lateral direction (the Y direction) and in the depth direction (the X direction) of the ceiling 2003a. More specifically, 50 interior illumination apparatuses 2007 are arrayed with 10 rows (in the Y direction) and 5 columns (in the X direction).

The interior illumination apparatus 2007 includes an interior illuminator 2007a, a brightness detection portion 2007b, and a control portion 2007c. The brightness detection portion 2007b and the control portion 2007c are configured to be integral with the interior illuminator 2007a.

The interior illumination apparatus 2007 may include a plurality of interior illuminators 2007a and a plurality of brightness detection portions 2007b. Note that one brightness detection portion 2007b is provided for each interior illuminator 2007a. The brightness detection portion 2007b receives reflected light from a radiated surface to be illuminated by the interior illuminator 2007a and detects the illuminance of the radiated surface. The brightness detection portion 200b detects the illuminance of the desk upper surface 2005a of the desk 2005 placed in the room here.

The control portions 2007c, one of which is provided for each interior illumination apparatus 2007, are connected to one another. The interior illumination apparatuses 2007 perform feedback control which adjusts light output from LED lamps of the respective interior illuminators 2007a with the control portions 2007c connected to one another such that the illuminance of the desk upper surface 2005a detected by each brightness detection portion 2007b is fixed target illuminance L0 (for example, average illuminance of 750 lx).

Figure 16:
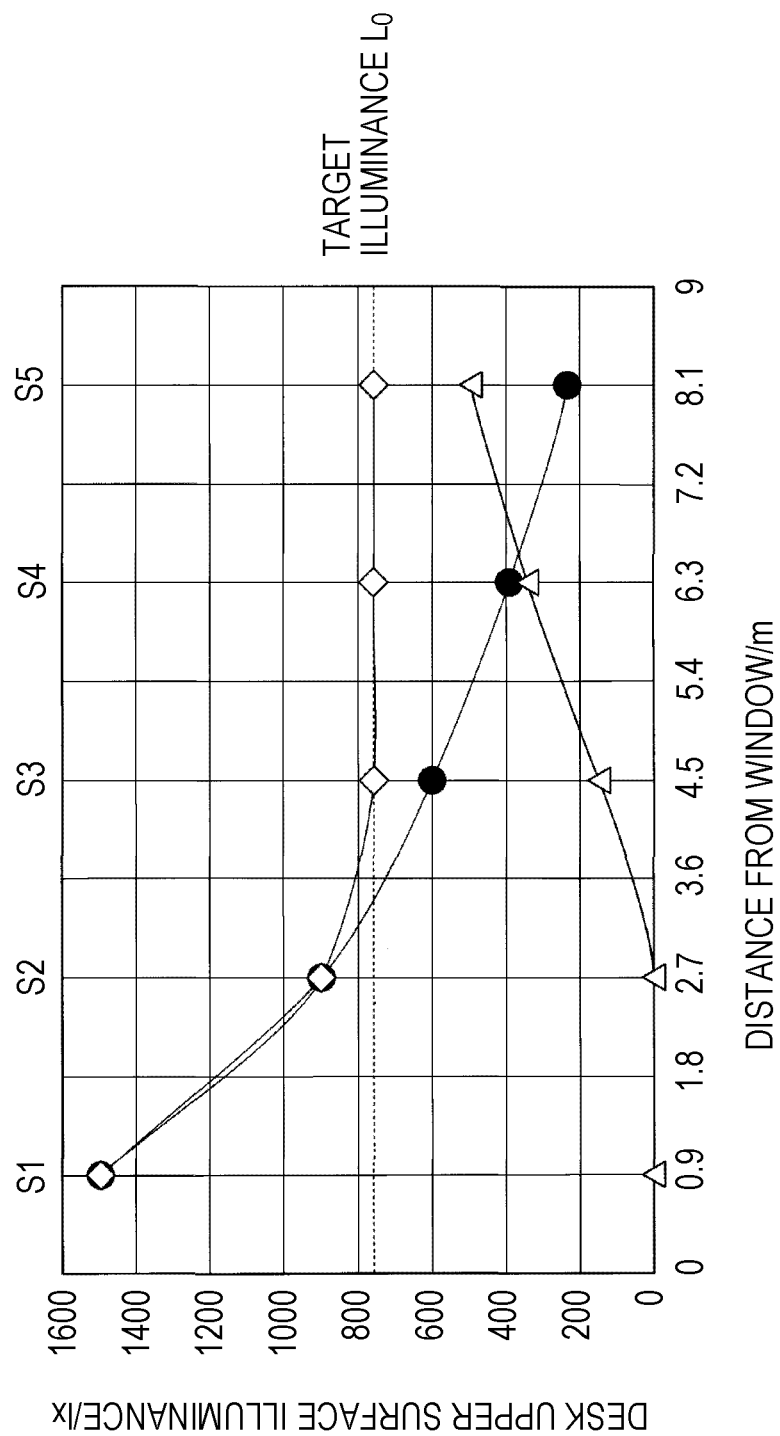
FIG. 16 is a graph showing a relationship between illuminance given by light (natural light) let into a room by a lighting apparatus and illuminance (the illumination dimming system) given by interior illumination apparatuses.

FIG. 16 is a graph showing a relationship between illuminance given by light (natural light) let into the room by the lighting apparatus and illuminance (the illumination dimming system) given by the interior illumination apparatuses.

As shown in FIG. 16, the illuminance of a desk upper surface given by the lighting apparatus 2010 (through letting in natural light) decreases with an increase in the distance from the window. In contrast, if the interior illumination apparatuses 2007 (the illumination dimming system) are installed on the ceiling in the room without installing the lighting apparatus 2010 on the window, the illuminance of a desk upper surface increases with an increase in the distance from the window. It is apparent that the illuminance of a desk upper surface is higher throughout the room in a case where the lighting apparatus 2010 and the interior illumination apparatuses 2007 (the illumination dimming system) are concurrently used than in a case where either one of the lighting apparatus 2010 and the interior illumination apparatuses 2007 (the illumination dimming system) is used. Owing to the effect of the lighting apparatus 2010, it is brightest at the window. Brightness is seen decreasing slightly with an increase in the distance from the window, but approximately fixed illuminance (average illuminance of 750 lx) is achieved.

As has been described above, the concurrent use of the lighting apparatus 2010 and the illumination dimming system (the interior illumination apparatuses 2007) allows light to be delivered to the back of the room, which allows a further increase in the brightness of the room. Thus, a more stable bright light environment can be achieved without being affected by a solar altitude.

INDUSTRIAL APPLICABILITY

The present invention can be used for a lighting member, a lighting device, and a method for installing the lighting member capable of effectively letting light into a space, such as the interior of a room.

REFERENCE SIGNS LIST 1, 16, 21, 25, 31, 35, 41, 46, 57 lighting film
2, 22, 32, 36 first base material
3, 28, 33 lighting portion
4 first bonding layer
5 second base material 7 light scattering layer
9 void portion
23 convex lens
43 plate material (light absorbing member)
45, 55 lighting device
47 blind (light attenuating member)

The invention claimed is:

1. A lighting member comprising:
   a first base material having optical transparency;
   a plurality of lighting portions having optical transparency which are provided on a first surface of the first base material; and
   a void portion which is provided between the plurality of lighting portions,
   wherein part of a side surface of the lighting portion in contact with the void portion functions as a reflective surface which reflects light entering the lighting portion,
   if a virtual straight line F that passes through a point C, at which any one light beam of the light entering the lighting portion is incident on the reflective surface, and is orthogonal to the first surface of the first base material marks a boundary between two spaces, a space with the light beam incident on the point C of the two spaces is labeled as a first space, and a space without the light beam incident on the point C is labeled as a second space,
   the lighting member has a function of decreasing the intensity of the light emitted from the first base material or the lighting portion and traveling toward the second space of light,
   the function of decreasing the intensity of light further comprises scattering the light to travel toward the second space,
   the function of scattering includes:
      a first scattering function in a first plane along a main extending direction of the side surface of the lighting portion functioning as the reflective surface, and
      a second scattering function in a second plane that is orthogonal to the first plane, and
   the first scattering function is an anisotropic scattering function causing more scattering than scattering in another plane different from the first plane.

2. The lighting member according to claim 1, wherein the function is a function of selectively scattering the light.

3. The lighting member according to claim 1, wherein the first base material or the lighting portion has light scattering ability.

4. The lighting member according to claim 1, further comprising:
   a second base material which is provided on an opposite side of the lighting portions from the first base material; and
   a bonding layer which bonds the lighting portions and the second base material together, wherein
   the second base material or the bonding layer has light scattering ability.

5. The lighting member according to claim 1, wherein the first base material or a light emitting side of the lighting portion includes a light attenuating member, the light attenuating member decreases intensity of the light traveling from the first base material or a light emitting side of the lighting portion toward the second space.

6. The lighting member according to claim 5, wherein the light attenuating member is a light reflecting member which reflects the light traveling toward the second space.

7. The lighting member according to claim 5, wherein the light attenuating member is a light absorbing member which absorbs the light traveling toward the second space.

8. The lighting member according to claim 1, wherein
   a first width of a first end face and a second width of a second end face of the lighting portion are 10 μm to 50 μm, and a height of the lighting portion is 10 μm to 100 μm.

9. A lighting device comprising:
   a lighting member; and
   a light attenuating member,
   wherein the lighting member includes a first base material having optical transparency, a plurality of lighting portions having optical transparency which are provided on a first surface of the first base material, and a void portion which is provided between the plurality of lighting portions, and part of a side surface of the lighting portion in contact with the void portion functions as a reflective surface which reflects light entering the lighting portion,
   if a virtual straight line F that passes through a point C, at which any one light beam of the light entering the lighting portion is incident on the reflective surface, and is orthogonal to the first surface of the first base material marks a boundary between two spaces, a space with the light beam incident on the point C of the two spaces is labeled as a first space, and a space without the light beam incident on the point C is labeled as a second space,
   the light attenuating member has a function of decreasing the intensity of the light emitted from the first base material or the lighting portion and traveling toward the second space of light,
   the function of decreasing the intensity of light further comprises scattering the light to travel toward the second space,
   the function of scattering includes:
      a first scattering function in a first plane along a main extending direction of the side surface of the lighting portion functioning as the reflective surface, and
      a second scattering function in a second plane that is orthogonal to the first plane, and
   the first scattering function is an anisotropic scattering function causing more scattering than scattering in another plane different from the first plane.

10. A method for installing a lighting member,
   the lighting member including
      a first base material having optical transparency,
      a plurality of lighting portions having optical transparency which are provided on a first surface of the first base material, and
      a void portion which is provided between the plurality of lighting portions,
   part of a side surface of the lighting portion in contact with the void portion functioning as a reflective surface which reflects light entering the lighting portion,
   the lighting member having a function of, if a virtual straight line F that passes through a point C, at which any one light beam of the light entering the lighting portion is incident on the reflective surface, and is orthogonal to the first surface of the first base material marks a boundary between two spaces, a space with the light beam incident on the point C of the two spaces is labeled as a first space, and a space without the light beam incident on the point C is labeled as a second space, decreasing intensity of the light emitted from the first base material or the lighting portion and traveling toward the second space of light,
wherein decreasing the intensity of light further comprises scattering the light to travel toward the second space, scattering the light including:
   a first scattering function in a first plane along a main extending direction of the side surface of the lighting portion functioning as the reflective surface, and
   a second scattering function in a second plane that is orthogonal to the first plane, and
the first scattering function being an anisotropic scattering function causing more scattering than scattering in another plane different from the first plane,
wherein the method includes arranging the lighting member such that the side surface of the lighting portion functioning as the reflective surface faces downward in a vertical direction and installing the lighting member at an upper portion of a window.

* * * * *